(12) United States Patent
Lee et al.

(10) Patent No.: US 8,001,220 B2
(45) Date of Patent: Aug. 16, 2011

(54) DYNAMIC UI SYSTEM AND METHOD FOR REMOTELY CONTROLLING LEGACY DEVICE

(75) Inventors: Sang-Bong Lee, DaeJeon (KR);
Moon-Ok Choi, ChungBuk (KR);
Tae-In Hwang, DeeJeon (KR);
Byeong-Thaek Oh, DaeJeon (KR);
Shin-Yuk Kang, DaeJeon (KR); Ho-Jin Park, DaeJeon (KR); Hae-Ryong Lee, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 240 days.

(21) Appl. No.: 12/186,810

(22) Filed: Aug. 6, 2008

(65) Prior Publication Data

US 2009/0157886 A1 Jun. 18, 2009

(30) Foreign Application Priority Data

Dec. 13, 2007 (KR) .................. 10-2007-0130236

(51) Int. Cl.
*G06F 15/177* (2006.01)

(52) U.S. Cl. .............. 709/220; 709/223; 715/735
(58) Field of Classification Search .......... 709/227–228, 709/220–223; 715/735–740
See application file for complete search history.

(56) References Cited

U.S. PATENT DOCUMENTS

| 2005/0128048 A1* | 6/2005 | Krzyzanowski et al. .... 340/3.71 |
| 2005/0282637 A1* | 12/2005 | Gatto et al. ..................... 463/42 |
| 2009/0103695 A1* | 4/2009 | Katis et al. ................. 379/93.01 |

FOREIGN PATENT DOCUMENTS

KR 1020070034341 3/2007

* cited by examiner

*Primary Examiner* — Salad Abdullahi
(74) *Attorney, Agent, or Firm* — Staas & Halsey LLP

(57) ABSTRACT

A dynamic user interface (UI) system and method is provided for remote controlling of a legacy device, which is not compatible with a peer-to-peer (P2P) middleware, through a P2P network. The dynamic UI system of the present includes at least one legacy device, a proxy for registering and managing the at least one legacy device and supporting a dynamic remote control user interface using a multi legacy device control protocol, and an edge peer for downloading the dynamic remote control user interface from the proxy and requesting control of the at least one legacy device to the proxy.

13 Claims, 3 Drawing Sheets

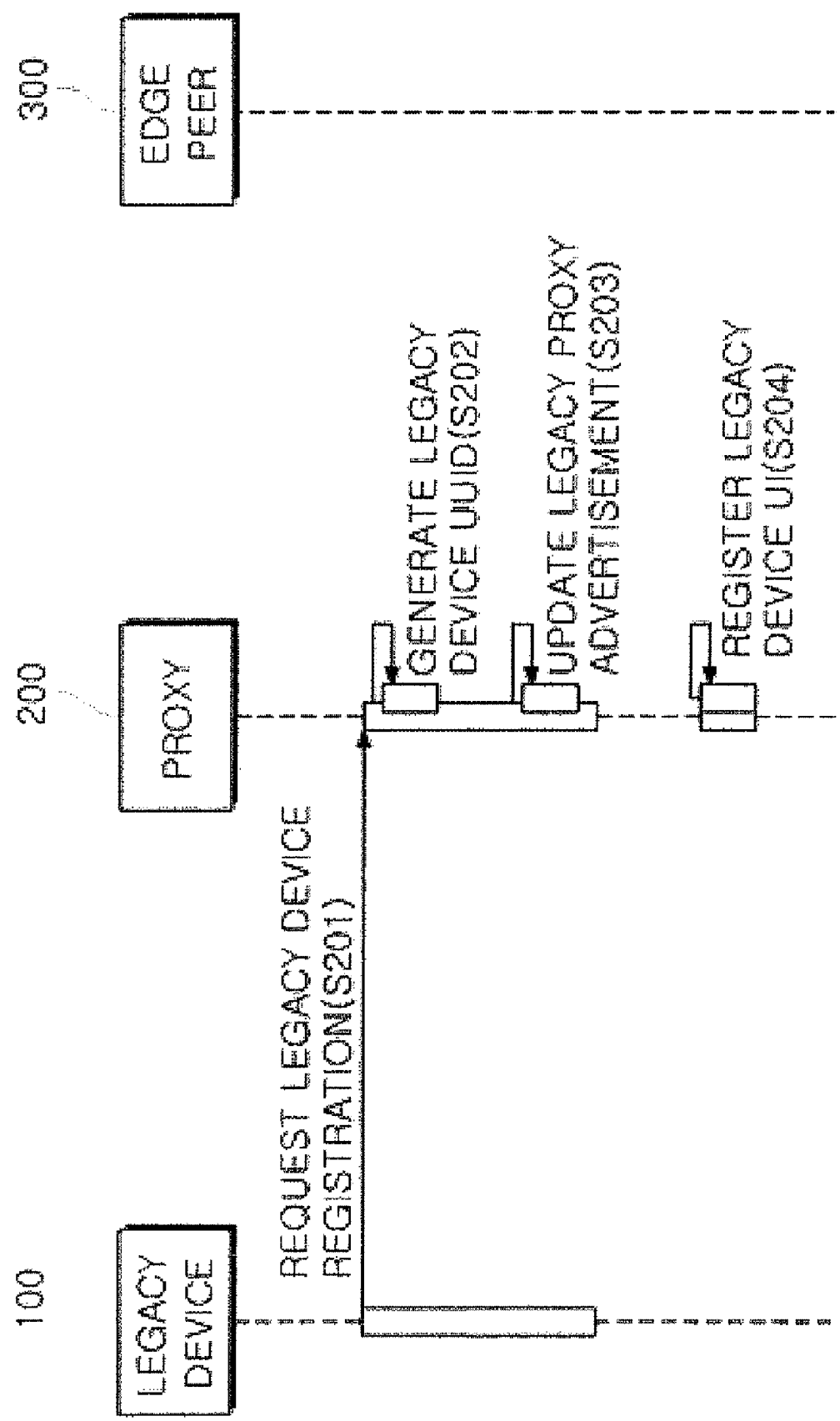

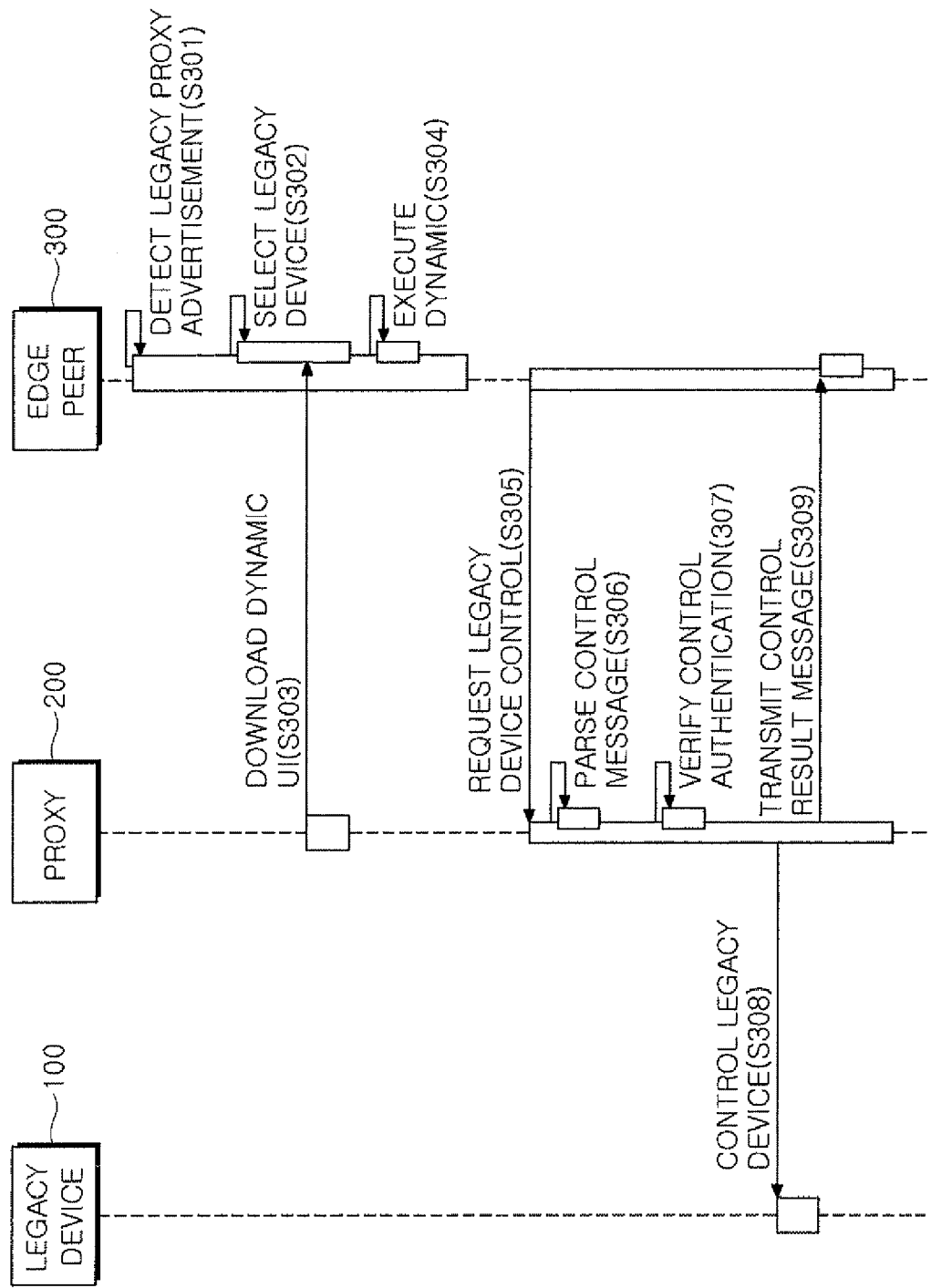

DYNAMIC UI SYSTEM AND METHOD FOR REMOTELY CONTROLLING LEGACY DEVICE

CROSS-REFERENCE TO RELATED APPLICATIONS

This application claims priority under 35 U.S.C. §119 to Korean Patent Application No. 10-2007-130236, filed on Dec. 13, 2007, the disclosure of which is incorporated herein by reference in its entirety

BACKGROUND OF THE INVENTION

1. Field of the Invention

The present invention relates to a remote controlling technology and, in particular, to a dynamic user interface (UI) system and method for remotely controlling various legacy devices, which are not compatible with a peer-to-peer (P2P) middleware, through a P2P network.

This work was supported by the IT R&D program of MIC/IITA[2006-S-068-02, Development of Virtual Home Platform based on Peer-to-Peer Networking]

2. Description of the Related Art

Typically, a remote information sharing service is implemented with a central server deployed on a network.

In such central server-based contents sharing method, however, obtaining a content file is somewhat laborious and inefficient for a stand-alone device since the content file should be downloaded using a personal computer (PC) connected to the central server.

In order to solve this problem, researches on peer-to-peer (P2P) networks have been widely carried out for sharing contents regardless of place and time.

P2P networks are convenient and efficient for sharing information. However, the conventional P2P technologies do not support content sharing and remote control functions to most of the legacy devices equipped with a P2P middleware.

SUMMARY OF THE INVENTION

The present invention has been made in an effort to solve the above problems, and the present invention provides a dynamic UI system and method that enables remotely controlling various legacy devices, which are not compatible with P2P middleware, through a P2P network.

Also, the present invention provides a dynamic UI system and method that is capable of dynamically downloading device control UIs of different devices and remotely controlling the devices using the downloaded device control UIs.

In one aspect of the present invention, a dynamic user interface system for remotely controlling a legacy device includes at least one legacy device; a proxy for registering and managing the at least one legacy device, and supporting a dynamic remote control user interface using a multi legacy device control protocol; and an edge peer for downloading the dynamic remote control user interface from the proxy and requesting control of the at least one legacy device to the proxy.

In accordance with another aspect of the present invention, a device registration method for remotely controlling legacy devices includes advertising a proxy using a proxy advertisement; receiving a request for registering a legacy device; generating a universal unique identifier to be assigned to the legacy device; updating the proxy advertisement; and registering a user interface of the legacy device.

In accordance with another aspect of the present invention, a dynamic user interface method for remotely controlling legacy devices includes detecting, at an edge peer, a proxy advertisement; selecting a legacy device referring the proxy advisement; downloading a dynamic remote control user interface for the selected legacy device; executing the downloaded dynamic remote control user interface; transmitting a control request message for controlling the legacy device; and receiving a control result message containing a value resulted from controlling the legacy device.

BRIEF DESCRIPTION OF THE DRAWINGS

The above and other objects, features and advantages of the present invention will be more apparent from the following detailed description in conjunction with the accompanying drawings, in which:

FIG. 2 is a message flow diagram illustrating steps of registering a legacy device in the dynamic UI system according to an exemplary embodiment of the present invention; and FIG. 3 is a message flow diagram illustrating steps of executing a dynamic UI in the dynamic UI system according to an exemplary embodiment of the present invention.

DETAILED DESCRIPTION OF EXEMPLARY EMBODIMENTS

Figure 1:
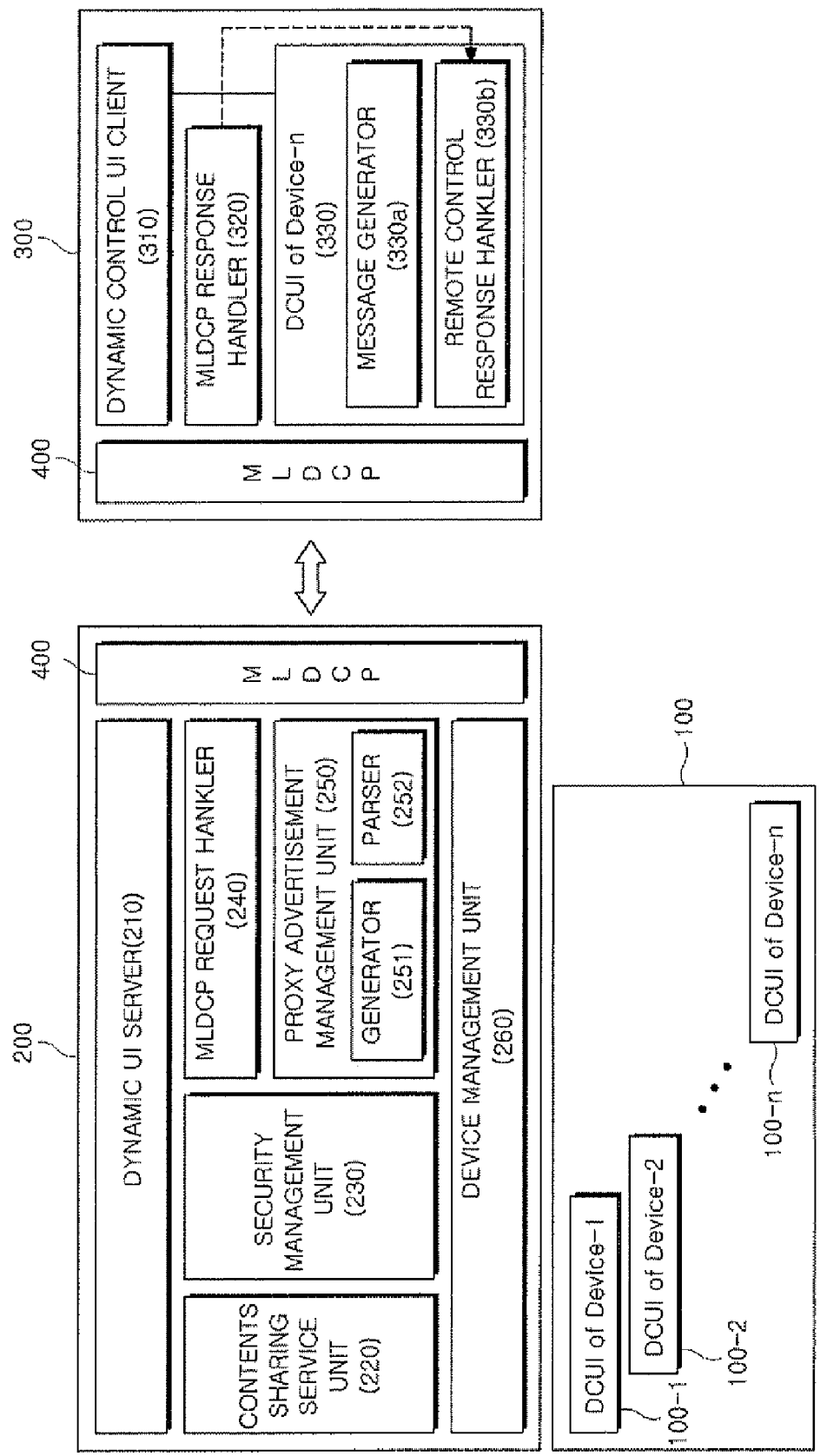
FIG. 1 is a block diagram illustrating a configuration of a dynamic UI system according to an exemplary embodiment of the present invention.

Exemplary embodiments of the present invention are described with reference to the accompanying drawings in detail. In view of the wide variety of embodiments to which the principles of the present invention can be applied, it should be understood that the illustrated embodiments are exemplary only, and should not be taken as limiting the scope of the present invention.

FIG. 1 is a block diagram illustrating a configuration of a dynamic UI system according to an exemplary embodiment of the present invention.

Referring to FIG. 1, the dynamic UI system includes legacy devices 100, a proxy 200 for registering and managing the legacy devices 100 and supporting dynamic remote control UI using a multi legacy device control protocol (MLDCP) 400, and an edge peer 300 requesting a control of the legacy device using the dynamic remote control UI downloaded from the proxy 200.

The legacy devices 100 are electronic devices that are connected to a network and registered and managed by the proxy 200.

The proxy 200 includes a dynamic UI server 210, a contents sharing service unit 220, a security management unit 230, an MLDCP request handler 240, a proxy advertisement management unit 250, and a device management unit 260.

If a request for information on the dynamic UI is received from the edge peer 300, the dynamic UI server 210 transmits a corresponding UI to the edge peer 300 in response to the request.

The contents sharing service unit 220 transmits the dynamic UI to the edge peer 300 through a P2P network.

The security management unit 230 is a unit that is can be selectively implemented for authenticating edge peer 300.

The MLDCP request handler 240 is a unit for processing a remote control request message received from the edge peer 300, and the proxy advertisement management unit 250 is responsible for generating, transmitting, and parsing a proxy advertisement. The proxy advertisement management unit 250 includes a generator for generating a proxy advertisement and a parser 252 for parsing the proxy advertisement.

The device management unit 260 is a unit for managing and providing profiles, dynamic control UI, and associated information of the legacy devices 100.

The edge peer 300 includes a dynamic UI client 310, an MLDCP response handler 320, and a dynamic control user interface (DCUI) 330 of the devices.

The dynamic UI client 310 is responsible for receiving the dynamic remote control UI from the proxy 200 and transmitting the remote control message generated by the dynamic UI to the proxy 200.

The MLDCP response handler 320 is a unit for processing a result message output after remotely controlling the legacy devices 100 such that, if it is required to transmit the dynamic remote control UI, the MLDCP response handler 320 transmits the corresponding message to the remote control response handler 330b of the dynamic UI.

The DCUI 330 is developed and provided by manufacturer of the legacy devices and includes a message generator 330a for processing the MLDCP message and a remote control response handler 330b for reflecting the remote control result to the UI.

The MLDCP 400 is a protocol for defining the proxy advertisement, legacy device advertisement, legacy device interface advertisement, control request message for controlling the legacy devices 100, and control response message including a result value of the legacy device control. The MLDCP 400 supports a communication using the dynamic remote control UI.

The advertisement on the proxy 200 is defined as following:

```
<xs:element name="LegacyProxyAdvertisement"
 type="LegacyProxyAdvertisement"/>
    <xs:complexType name="LegacyProxyAdvertisement">
        <xs:sequence>
    <xs:element name="PID" type="jxta:JXTAID"/>
    <xs:element name="GID" type="jxta:JXTAID"/>
    <xs:element name="Name" type="xs:string"/>
    <xs:element name="Desc" type="xs:string"/>
    <xs:element name="Ver" type="xs:string"/>
    <xs:element name="LegacyDevice"
 type="LegacyDeviceAdvertisement" minOccurs="0"/>
    <xs:element name="any" type="xs:anyType"/>
    </xs:sequence>
    </xs:complexType>
```

PID: Define a Universal Unique Identifier (UUID) as a unique ID of proxy.

GID: Define a UUID as a unique ID of a group the proxy participated.

Desc: Detailed description information on the proxy.

Ver: Version information on the proxy.

LegacyDevice: Information on the electric device connected to the proxy. It can be repeated as many as a number of the connected electric devices.

any: Reserved for extendibility.

Also, the legacy device advertisement is defined as following:

```
<xs:element name="LegacyDeviceAdvertisement"
 type="LegacyDeviceAdvertisement"/>
    <xs:complexType name="LegacyDeviceAdvertisement">
        <xs:sequence maxOccurs="unbounded">
    <xs:element name="Id" type="jxta:JXTAID"/>
    <xs:element name="Type" type="xs:string"/>
    <xs:element name="Name" type="xs:string"/>
    <xs:element name="Desc" type="xs:string"/>
    <xs:element name="LegacyDeviceInterface"
 type="LegacyDeviceInterface"/>
    <xs:element name="any" type="xs:anyType"/>
    </xs:sequence>
        </xs:complexType>
```

Id: Define UUID for uniquely identifying the electric device.

Type: Type of the electric device.

Name: Name of the electric device

Desc: Detailed description on the electric device.

LegacyDeviceInterface: Information on the dynamic control UI of electric device.

Any: Reserved for extendibility.

Also, the legacy device interface advertisement is defined as following:

```
<xs:element name="LegacyDeviceInterface"
 type="LegacyDeviceInterface"/>
<xs:complexType name="LegacyDeviceInterface">
<xs:sequence maxOccurs="unbounded">
<xs:element name="Platform" type="PlatformType"/>
<xs:element name="Title" type="xs:string"/>
<xs:element name="Width" type="xs:integer"/>
<xs:element name="Height" type="xs:integer"/>
<xs:element name="DownloadURL" type="xs:string"/>
<xs:element name="any" type="xs:anyType"/>
    </xs:sequence>
    </xs:complexType>
    <xs:simpleType name="PlatformType">
    <xs:restriction base="xs:string">
    <xs:enumeration value="Windows XP"/>
    <xs:enumeration value="PocketPC 2003"/>
<xs:enumeration value="OTHER"/>
        </xs:restriction>
        </xs:simpleType>
```

Platform: Platform information for normal operation of the dynamic remote control UI.

Title: Title of the dynamic remote control UI.

Width: Width of the dynamic remote control UI.

Height: Height of the dynamic remote control UI.

DownloadURL: URL information for downloading the dynamic remote control UI.

any: Reserved for extendibility.

Also, control request message for controlling the legacy device 100 is defined as following:

```
<xs:element name="MLDCPQueryMsg" type="MLDCPQueryMsg"/>
<xs:complexType name="MLDCPQueryMsg">
        <xs:sequence>
<xs:element name="sourcePid" type="jxta:JXTAID"/>
<xs:element name="tragetProxyPid" type="jxta:JXTAID"/>
<xs:element name="request" type="MLDCPRequestMsg"/>
        </xs:sequence>
        </xs:complexType>
    <xs:complexType name="MLDCPRequestMsg">
            <xs:sequence>
    <xs:element name="targetDevicePid" type="jxta:JXTAID"/>
    <xs:element name="cmd" type="xs:string"/>
    <xs:element name="params" type="MLDCPParmsType"/>
        </xs:sequence>
        </xs:complexType>
    <xs:complexType name="MLDCPParamsType">
```

-continued

```
        <xs:choice>
            <xs:element name="param" type="xs:string"
                maxOccurs="unbounded"/>
            <xs:element name="any" type="xs:anyType"/>
        </xs:choice>
        <xs:attribute name="num" type="xs:integer"/>
</xs:complexType>
```

Also, the response message of the value resulted from the control of the legacy device 100 is defined as following:

```
<xs:element name="MLDCPResponse" type="MLDCPResponse"/>
    <xs:complexType name="MLDCPResponse">
        <xs:sequence>
<xs:element name="sourcePid" type="jxta:JXTAID"/>
<xs:element name="targetPid" type="jxta:JXTAID"/>
<xs:element name="timestamp" type="xs:unsignedLong"/>
<xs:element name="response" type="MLDCPResponseMsg"/>
</xs:sequence>
        </xs:complexType>
<xs:complexType name="MLDCPResponseMsg">
        <xs:sequence>
    <xs:element name="requestCmd" type="xs:string"/>
    <xs:element name="success" type="xs:boolean"/>
    <xs:element name="description" type="xs:string"/>
    <xs:element name="any" type="xs:anyType"/>
        </xs:sequence>
            </xs:complexType>
```

With the above-defined MLDCP and proxy 200 using the MLDCP, edge peer 300 and dynamic remote control UI unit, it is possible to remotely control various legacy devices through the P2P network.

FIG. 2 is a message flow diagram illustrating steps of registering a legacy device in the dynamic UI system according to an exemplary embodiment of the present invention.

As shown in FIG. 2, a legacy device 100 transmits a legacy device registration request to the proxy 200 at step S201.

Upon receiving the legacy device registration request, the proxy 200 generates a UUID of the legacy device 100 at step s202. Here, a legacy device advertisement for advertising information on the legacy device 100 connected to the proxy is broadcasted by means of the above-described MLDCP.

After generating the UUID of the legacy device 100, the proxy 200 updates the advertisement at step S203 and then registers the legacy device 100 at step S204.

FIG. 3 is a message flow diagram illustrating steps of executing a dynamic UI in the dynamic UI system according to an exemplary embodiment of the present invention.

As shown in FIG. 3, the edge peer 300 scans for the proxy advertisements at step S301.

If a proxy advertisement is detected, the edge peer 300 selects a legacy device at step S302. The legacy device interface advertisement for presenting the information on the dynamic remote control UI of the legacy device 100 is transmitted by means of MLDCP.

After selecting a legacy device, the edge peer 300 downloads the dynamic remote control UI for the selected legacy device 100 from the proxy 200 at step S303. Upon receiving the dynamic remote control UI, the edge peer 300 executes the dynamic remote control UI at step S304.

Next, the edge peer 300 transmits a legacy device control request to the proxy 200 at step S305.

Open receiving the legacy device control request, the proxy 200 parses the received legacy device control request at step S306 and verifies the control authentication to the legacy device 100 at step S307.

Here, the legacy device control request message is transmitted to the proxy 200 using the MLDCP.

If the control authentication is successfully verified, the proxy 200 transmits a legacy device control message to the legacy device 100 such that the legacy device 100 is controlled according to the legacy device control message at step S308.

Next, the proxy 200 transmits a control result message to the edge peer 300 at step S309. Here, both the legacy device control message and control result message are transmitted using the MLDCP.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the dynamic UI system and method of the present invention enables dynamically downloading control UIs of different electric devices, which are not compatible with P2P middleware, and remotely controlling the legacy devices through a P2P network.

What is claimed is:

1. A dynamic user interface system for remotely controlling a legacy device, comprising:
    at least one legacy device;
    a proxy for registering and managing the at least one legacy device, and supporting a dynamic remote control user interface using a multi legacy device control protocol; and
    an edge peer for downloading the dynamic remote control user interface from the proxy and requesting control of the at least one legacy device to the proxy
    wherein the multi legacy device control protocol defines a proxy advertisement, a legacy device interface advertisement, a control message for controlling the legacy device, a control response message containing a value resulted from controlling the legacy device.

2. The dynamic user interface system of claim 1, wherein the proxy comprises:
    a dynamic user interface server for providing user interface information to the edge peer;
    a content sharing service unit for transmitting the user interface information provided by the dynamic user interface server to edge peer;
    a multi legacy device control protocol request handler for processing a remote control request message received from the edge peer; and
    a device management unit for managing the dynamic remote control user interfaces of the legacy devices.

3. The dynamic user interface system of claim 2, wherein the proxy further comprises a proxy advertisement manager for generating, transmitting, and parsing proxy advertisements.

4. The dynamic user interface system of claim 3, wherein the proxy advertisement manager comprises:
    a generator for generating a proxy advertisement; and
    a parser for parsing the proxy advertisement.

5. The dynamic user interface system of claim 2, wherein the proxy further comprises a security manager for authenticating the edge peer.

6. The dynamic user interface system of claim 1, wherein the edge peer comprises:
    a dynamic user interface client for receiving the dynamic remote control user interface and transmitting a remote control message to the proxy; and a multi legacy device control protocol response handler for processing a remote control result message received from the proxy.

7. A device registration method for remotely controlling legacy devices, comprising:
   advertising a proxy using a proxy advertisement;
   receiving a request for registering a legacy device;
   generating a universal unique identifier to be assigned to the legacy device;
   updating the proxy advertisement; and
   registering a user interface of the legacy device,
   wherein the method uses a multi legacy device control protocol which defines the proxy advertisement, a legacy device interface advertisement, a control message for controlling the legacy device, and a control response message containing a value resulted from controlling the legacy device.

8. The device registration method of claim 7, wherein the proxy advertisement comprises a unique identifier of the proxy, a unique group identifier of a group in which the proxy participates, and version information of the proxy.

9. The device registration method of claim 7, wherein the proxy advertisement comprises a unique identifier, type, name, detailed description, and extendibility information of the legacy device.

10. The device registration method of claim 7, wherein the proxy advertisement comprises information on a platform supporting the dynamic remote control user interface; information on a title, width, and height of the dynamic remote control user interface; and dynamic remote control extendibility information.

11. A dynamic user interface method for remotely controlling legacy devices, comprising:
   detecting, at an edge peer, a proxy advertisement;
   selecting a legacy device referring the proxy advisement;
   downloading a dynamic remote control user interface for the selected legacy device;
   executing the downloaded dynamic remote control user interface;
   transmitting a control request message for controlling the legacy device; and
   receiving a control result message containing a value resulted from controlling the legacy device,
   wherein the method uses a multi legacy device control protocol which defines the proxy advertisement, a legacy device interface advertisement, the control request message for controlling the legacy device, and the control result message containing the value resulted from controlling the legacy device.

12. The dynamic user interface method of claim 11, wherein the control request message comprises a unique identifier of a proxy as a receiver, a unique identifier of the legacy device to be controlled, a control command, and a control parameter.

13. The dynamic user interface method of claim 11, wherein the control result message comprises a unique identifier of a proxy as a sender, a unique identifier of a peer edge as a receiver, a time stamp, a control command, and a control result indicator.

* * * * *